United States Patent
Chen et al.

(10) Patent No.: US 8,464,058 B1
(45) Date of Patent: Jun. 11, 2013

(54) PASSWORD-BASED CRYPTOGRAPHIC METHOD AND APPARATUS

(75) Inventors: Liqun Chen, Bristol (GB); Saugat Majumdar, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1204 days.

(21) Appl. No.: 12/258,736

(22) Filed: Oct. 27, 2008

Related U.S. Application Data

(60) Provisional application No. 61/043,253, filed on Apr. 8, 2008.

(51) Int. Cl.
*H04L 9/00* (2006.01)

(52) U.S. Cl.
USPC ........... 713/171; 713/168; 713/169; 713/170; 380/44; 380/284

(58) Field of Classification Search
USPC ......................................................... 713/171
See application file for complete search history.

(56) References Cited

U.S. PATENT DOCUMENTS

| | | | | |
|---|---|---|---|---|
| 4,405,829 | A * | 9/1983 | Rivest et al. | 380/30 |
| 6,226,383 | B1 | 5/2001 | Jablon | |
| 7,047,405 | B2 * | 5/2006 | Mauro | 713/166 |
| 7,451,147 | B1 * | 11/2008 | Kao et al. | 1/1 |
| 7,522,723 | B1 * | 4/2009 | Shaik | 380/30 |
| 7,526,651 | B2 | 4/2009 | Arditti Modiano et al. | |
| 7,571,324 | B2 | 8/2009 | Canard et al. | |
| 2001/0055388 | A1 | 12/2001 | Kaliski | |
| 2002/0194478 | A1 * | 12/2002 | MacKenzie | 713/171 |
| 2003/0163698 | A1 | 8/2003 | Kim et al. | |
| 2009/0210716 | A1 | 8/2009 | Chen | |
| 2010/0082973 | A1 | 4/2010 | Brickell et al. | |
| 2010/0169650 | A1 | 7/2010 | Brickell et al. | |

FOREIGN PATENT DOCUMENTS

| WO | WO-01/01627 | 1/2001 |
|---|---|---|
| WO | WO-01/95545 | 12/2001 |
| WO | WO-2011/007697 | 1/2011 |

OTHER PUBLICATIONS

Diffie et al, "New Directions in Cryptography."*
Schnorr, C.P., "Efficient Signature Generation by Smart Cards", Fachbereich Mathematik/ Informatik, Universitat Frankfurt, Mar. 1991.
Diffie, W., Hellman M.E., "Privacy and Authentication: An Introduction to Cryptography", Proceedings of the IEEE, vol. 67, No. 3, Mar. 1979.

(Continued)

*Primary Examiner* — Andrew Georgandellis

(57) ABSTRACT

A password-based cryptographic method is effected between a first party with a specified identity and secret password and a second party with a master secret. During a registration phase, a long-term password-based public key is generated for the first party from its password and the master secret of the second party. Subsequently, to generate matching keys, asymmetric or symmetric, for the parties for a specific interaction, the first party generates short-term secret x, and computes a short-term password-based public key that requires for its computation direct knowledge of the first party's password and secrets x; the second party then transforms this short-term password-based public key into an clement X, complimentary to x, by using its master secret and at least a first-party-specific constituent of the first party's long-term password-based public key. The secret x and element X are then used to provide matching keys for the parties.

26 Claims, 6 Drawing Sheets

OTHER PUBLICATIONS

Wu, T., "The SRP Authentication and Key Exchange System", The Internet Society 2000.

"Information technology—Security techniques—Digital signatures with appendix—Part 3: Discrete logarithm based mechanisms", British Standars ISO/IEC 14888-3:2006.

Information technology—Security techniques—Key management—Part 4: Mechanisms based on weak secrets, BS ISO/IEC 11770-4:2006.

Bellare, et al. "Foundations of group signatures: formal definitions, simplified requirements, and a construction based on general assumptions", In Advances in Cryptology—EUROCRYPT '03, LNCS 2656, 614-629, Springer-Verlag, 2003.

Boneh, et al., "Short group signatures", In Advances in Cryptology—CRYPTO '04, LNCS 3152, 41-55, Springer-Verlag, 2004.

Brickell, "Direct Anonymous attestation", Proceedings of the 11th ACM Conference on Computer Communications Security, ACM Press, 2004, pp. 132-145.

Brickell, "Simplified security notions for direct anonymous attestation and a concrete scheme for pairings", International Journal of Information Security 8, 2009, pp. 315-330.

Chaum, "Group Signatures", Advances in Cryptology, EUROCRYPT '91, LNCS 547, pp. 552-565, Springer-Verlag, 1991.

Ford, et al., "Server-assisted generation of a strong secret from a pass-word", in the Proceedings of the IEEE 9th International Workshops on Enabling Technologies: Infrastructure for Collaborative Enterprises, 176-180, IEEE, 2000.

GB Search Report dated Aug. 12, 2011, GB Patent Application No. 1106932.5 filed Oct. 27, 2008, UK Patent Office.

IEEE P1363.2/D26, "Standard for Specifications for Password-based Public Key Cryptographic Techniques", IEEE Sep. 2006.

Naor, et al., "Oblivious transfer with adaptive queries". In Advances in Cryptology—CRYPTO '99, LNCS 1666, 573-590. Springer-Verlag, 1999.

Rabin, et al., "How to exchange secrets by oblivious transfer", Technical Report TR-81, Aiken Computation Laboratory, Harvard University, 1981.

Rivest, et al., "How to leak a secret", In Advances in Cryptology—ASIACRYPT '01, LNCS 2248, 552-565, Springer-Verlag, 2001.

* cited by examiner

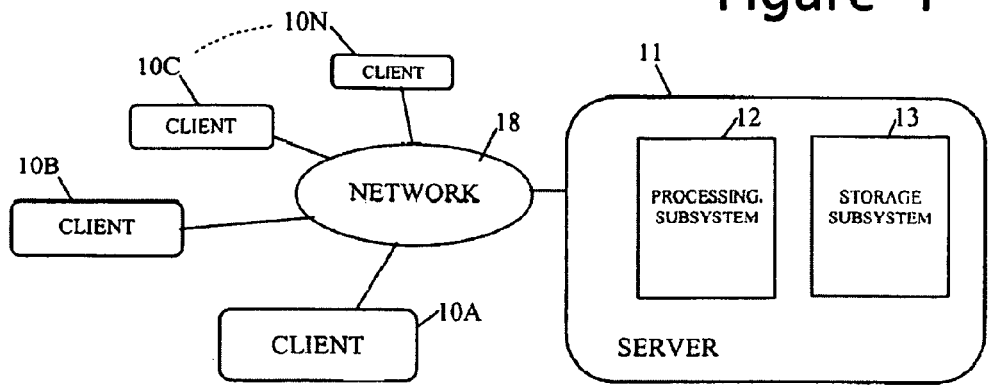
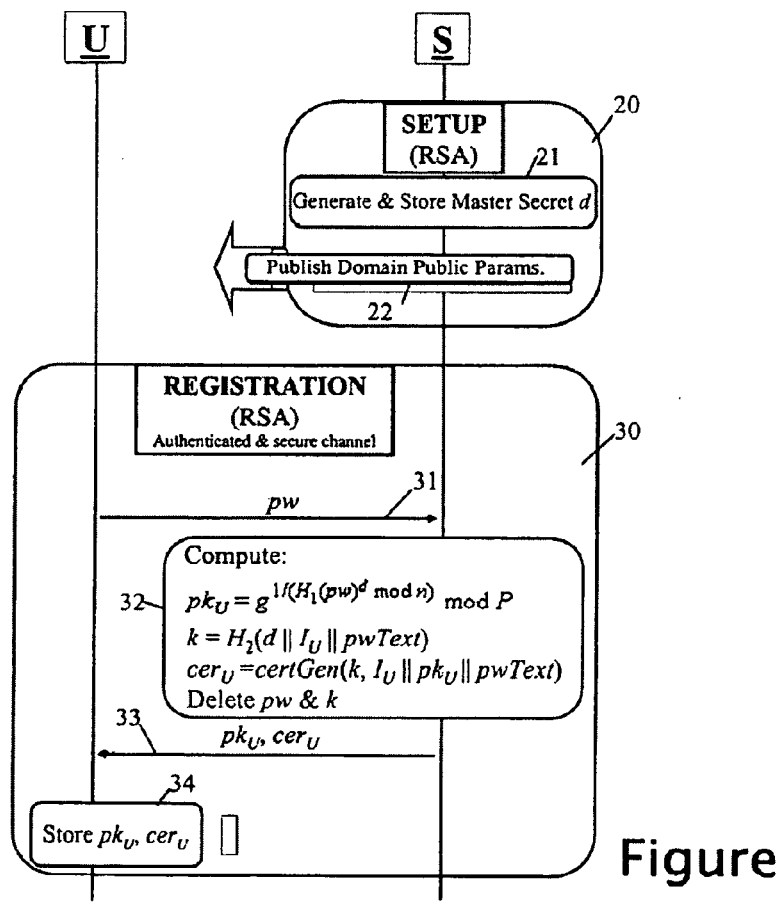

PASSWORD-BASED CRYPTOGRAPHIC METHOD AND APPARATUS

CROSS REFERENCE TO RELATED APPLICATIONS

This Application claims the benefit of provisional patent application Ser. No. 61/043,253, filed Apr. 8, 2008, titled "Password-based Cryptographic Method And Apparatus," which application is incorporated by reference herein as if reproduced in full below.

FIELD OF THE INVENTION

The present invention relates to password-based cryptographic methods and apparatus and in particular, but not exclusively, to password-based authenticated key agreement methods and apparatus and password-based designated verifier signature methods and apparatus.

BACKGROUND OF THE INVENTION

The provisioning of two parties with a shared secret key for symmetric-key cryptography presents a number of challenges including security of the provisioning and authentication of the recipient parties. This is true whether the keys are provisioned by physical distribution or by electronic means. Electronic provisioning is generally much preferable due to the very high cost and inconvenience of physical distribution.

A well known technique for electronic key provisioning is the Diffie-Hellman (DH) key exchange algorithm (see W. Diffie & M. E. Hellman, "Privacy and Authentication: An Introduction to Cryptography", Proceedings of the I.E.E.E., vol. 67, No. 3, March 1979). For this algorithm, public system parameters p, q and g are defined; when parties A and B with respective secrets $x_A$ and $x_B$ wish to share a symmetric key, each sends the other the public parameter g raised to the power of its respective secret. Thus, A sends B $g^{x_A}$ mod p, and B sends A $g^{x_B}$ mod p. The receiving party then raises the received value to the power of its own secret so that each ends up with the value $g^{x_A x_B}$ mod p which can be used as a symmetric key. A key formed in this way is referred to herein as a Diffie-Hellman or DH key.

Of course, this mechanism for provisioning two parties with a shared key does not provide any guarantee to either party regarding the identity of the other party. Accordingly, authenticated key agreement protocols have been devised that effectively combine a key agreement protocol, such as the above-described DH key exchange protocol, and functionality such that at the end of the protocol, the two parties are convinced with whom they share the session key.

Authentication information can take the form either of keys (assumed to be of high cryptographic quality) or of passwords (a small secret value, such as a PIN code or an eight character alphanumeric string, that is presumed to be unsafe for direct use as a cryptographic key, but remains, nevertheless, a valuable and safe authentication factor when properly used).

Key-based authentication involves the knowledge of the two parties' long term key(s): either asymmetric (public/private) key pairs or a pre-shared symmetric secret key. The major drawback of basing authentication on a cryptographic key is the inability of a human user to remember a cryptographically secure key without assistance.

The present invention is concerned with the use of passwords to authenticate the participants in a cryptographic protocol such as a key agreement protocol.

Password-based authenticated key agreement is a well explored and widely used cryptographic primitive. It is typically suitable for a server-client environment, where a client represents a human user typically capable of remembering a password but not a full size key. Although a password is a weak secret and is vulnerable to dictionary attack, in a properly constructed password-based authenticated key agreement scheme, the communication between the client and server over a public channel is secure against the dictionary attack.

There are two main types of password-based authenticated key agreement scheme:

(1) The two parties use the same password in the scheme protocol; this kind of scheme is called a 'balanced' scheme. One example is SPEKE (Simple Password Exponential Key Exchange) which basically comprises a DH key exchange where the generator g is created from a hash of the password. See U.S. Pat. No. 6,226,383.

(2) One party (typically the client in a client-server arrangement) uses the password and the other party (for example, the server) uses a digest of the password; this kind of scheme is called an 'augmented' scheme. One example is SRP-3 (Secure Remote Password). See IETF RFC 2945.

Where an existing password-based authenticated key agreement protocol is employed in the client server context, the server needs to store securely in its database the unique passwords (or password digests) of a possibly large number of clients, in order to be able to authenticate each client. Then, each time the protocol is run, the server must retrieve the password or the digest of the password and use it in the protocol. If an adversary is able to access the server's database or to spy on the server's processing, the adversary will be able to get the password or to search the password. Reducing the vulnerability of the client's password at the server is clearly desirable and one way of doing this is for the server to employ a long-term strong secret key to encrypt each password (or its digest). The server then decrypts each stored encrypted client password (or digest) before using it in the password-based authenticated key agreement protocol; after use, the decrypted password (or digest) is erased. Obviously, this approach is inefficient and still leaves the password/digest vulnerable during the running of the protocol. Furthermore, in some contexts, the memory available to the server for storing password-related data may be constrained, effectively limiting the number of users that the server can service.

SUMMARY OF THE INVENTION

According to one aspect of the present invention, there is provided a cryptographic method effected between first and second parties acting through respective computing entities, the first party having a specified identity, a secret password, and a long-term password-based public key that is dependent on at least said password and a master secret of the second party; the method comprising:

the first party generating a short-term random secret x, and then computing and supplying to the second party, a short-term password-based public key that requires for its computation direct knowledge of the first party's password and secret x;

the second party transforming the short-term password-based public key into an element X, complimentary to x but from which recovery of x is computationally infeasible, by using its master secret and at least a first-partyspecific constituent of the first party's long-term password-based public key; and using the secret x and element X to provide matching keys for the parties.

If the password used to generate the short-term password-based public key differs from that used for the long-term password-based public key providing the 'at least a first-party-specific constituent', then the element X will not complement the first party's secret x; the matching keys will therefore only be effective where the short-term password-based public key is generated and supplied to the second party by the first party.

According to another aspect of the present invention, there is provided apparatus comprising a first computing entity associated with a first party that has a specified identity, a secret password, and a long-term password-based public key, a second computing entity with an associated master secret, and a network over which the computing entities can communicate; wherein the first party's long-term password-based public key is dependent on at least the first party's password and the second party's master secret; and further wherein, in order to generate matching keys, asymmetric or symmetric, for a specific interaction between the first party and the second computing entity:

the first computing entity is arranged to generate a short-term random secret x, and then compute and supply to the second party, a first-party short-term password-based public key that requires for its computation direct knowledge of the first party's password and the secret x;

the second computing entity is arranged to transform the short-term password-based public key into an element X, complimentary to x but from which recovery of x is computationally infeasible, by using its master secret and at least a first-party-specific constituent of the first party's long-term password-based public key; and the computing entities using the secret x and element X to provide said matching keys.

According to a further aspect of the present invention, there is provided a password-based authenticated cryptographic method, comprising:

during a registration phase in which a first party, with a specified identity and secret password, registers with a second party, generating a long-term password-based public key in dependence on at least said password and a master secret of the second party;

during an operational phase:

the first party generating a short-term random secret x, and then computing and supplying to the second party, a short-term password-based public key that requires for its computation direct knowledge of the first party's password and its secret x;

the second party transforming the short-term password-based public key into an element X of the form (public parameter)$^x$ from which recovery of x is computationally infeasible by using its master secret and at least a first-party-specific constituent of the first party's long-term password-based public key; and using the secret x and element X to provide matching keys for the parties;

the first and second parties acting through respective computing entities.

BRIEF DESCRIPTION OF THE DRAWINGS

Embodiments of the invention will now be described, by way of non-limiting example, with reference to the accompanying diagrammatic drawings, in which:

FIG. 1 is a diagram of a client server networked system serving as an example context for describing embodiments of the invention;

FIG. 2 is a diagram illustrating operations carried out during set up and registration phases of a first embodiment of the invention;

BEST MODE OF CARRYING OUT THE INVENTION

Figure 3:
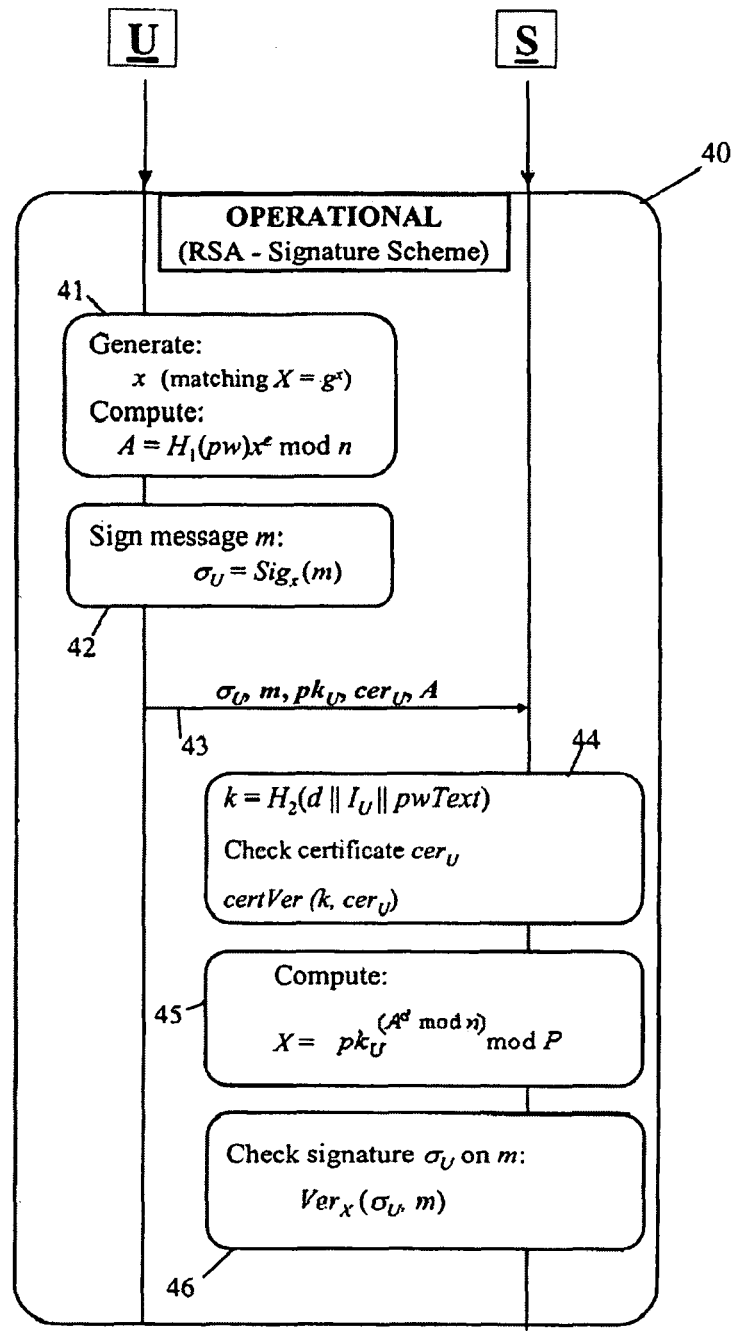
FIG. 3 is a diagram illustrating operations carried out during an operational phase of the first embodiment.

Four password-based (PWB) cryptographic schemes embodying the invention will now be described in the context of a client-server operational domain (see FIG. 1), in which multiple users acting through respective client computing entities (clients) 10A-10N are arranged to communicate with a server 11 via a network 18. The computing clients 10A-10N and the server 11 are typically based around general-purpose processors executing stored programs but may include dedicated cryptographic hardware modules. In the example shown in FIG. 1, the server 11 comprises a processing subsystem 12 and a storage subsystem 13 (the latter generically comprising any semiconductor memory and disc-based storage associated with the server 11).

In the following, each embodiment is described as being run between a first party U formed by a user acting through one of the computing clients 10A-10N, and a second party S formed by the server 11 (for convenience, the first and second parties are sometimes referred to simply as user U and server S). It is to be understood that although the following descriptions of embodiments of the invention are set in the context of a client-server domain, the PWB cryptographic schemes of these embodiments can be applied between any two parties with appropriate computing resources.

Of the four embodiments of the invention described below, two concern PWB designated verifier signature schemes and two concern PWB authenticated key agreement schemes: for each type of scheme, both an RSA based embodiment and a discrete-log (DL) based embodiment are described. Thus:

| First embodiment: | RSA-based | PWB Designated Verifier Signature Scheme |
| Second embodiment: | RSA-based | PWB Authenticated Key Agreement Scheme |
| Third embodiment: | DL-based | PWB Designated Verifier Signature Scheme |
| Fourth embodiment: | DL-based | PWB Authenticated Key Agreement Scheme |

A number of variants are also described.

Each PWB cryptographic scheme is, for convenience, described in terms of three phases, namely:

a system set up phase in which system public parameters are made available;

a registration phase, generally only effected once, in which the user U, with password pw, cooperates with the server S in the generation of a long-term password-based public key $pk_U$ for the user U (in this context, 'public' means that confidentiality of the key is not an issue rather than that the key is explicitly published); and an operational phase, generally intended to be effected multiple times (for example, for each new transaction/session of interaction between user U and server S) in which the password-based public key $pk_U$ is used for PWB signature/authenticated key agreement as the case may be.

As the registration phase (in which the user's password-based public key is generated) is the same for both RSA-based embodiments, this phase will only be described for one of these embodiments, namely the first embodiment concerning the signature scheme. Similarly, as the registration phase is the same for both DL-based embodiments, this phase will only be described for the third embodiment concerning the signature scheme. However, both for the RSA-based embodiments and the DL-based embodiments, two versions of the relevant registration phase are described, one for use when the user and server communicate over an authenticated and secure channel and the other where the user and server communicate over an authenticated but not necessarily secure channel. In the present specification:

An authenticated channel is a communication environment, where S and U send message flows to each other, in which when receiving a message, the receiver can find out who is the sender, and whether the message has been modified in the transferring channel or not. Providing an authenticated channel over a network can be achieved in a number of ways, well understood to person skilled in the art.

An authenticated and secure channel is an authenticated channel, where one or more message flows cannot be seen by anyone except S and U. Again, providing channel security over a network can be achieved in a number of ways, well understood to person skilled in the art.

An authenticated, or authenticated and secure, channel can also be established outside of a network environment, for example by direct personal attendance of the user U at the offices of the party associated with the server S.

As much of the notation used in the following description is the same for all embodiments, an explanation will next be given of this generically used notation (it should be noted that, outside of this generically—used notation, symbols used for certain variables in the RSA-based embodiments are also used for non-identical variables of the DL embodiments).

Party Related Quantities

The size of a quantity $\alpha$ is denoted by $/\alpha$.

$I_S$ is the identity of the server S.

$(sk_S; pk_S)$ is an asymmetric key pair of the server S; $sk_S$ is kept secret by S and $pk_S$ is public. Only used in the key agreement schemes.

$ms_S$ is a master secret of the server S (in appropriate cases $sk_S$ can be used for $ms_S$).

$I_U$ the identity of the user U.

pw is a long-term secret password of U; $pw \in_R \{0,1\}^{/pw}$ where $\in_R$ indicates 'chosen at random from'. $/pw$ is reasonably small, so that pw is human memorable and searchable. pw is kept secret by U.

$pk_U$ is the long-term password-based public key of U generated from U's password pw and S's master secret $ms_S$ as a result of the protocol run between S and U during the Registration phase. (Because $pk_U$ is a function of $ms_S$, pw cannot be searched for from $pk_U$ except by S, and it is assumed that an honest server S will not try to find out the password value of U).

x and X are a complementary pair of short-term (or session) key elements of U; x is kept secret by U and recovery of x from X is computationally infeasible;

A is a short-term (or session) password-based public key of U that requires a direct knowledge of pw and x for its generation. The quantities A, $ms_S$ and at least a user-specific constituent of $pk_U$ are combinable by S to recover X;

pwText denotes terms and conditions (pre-agreed by S and U) regarding use of the password pw; pwText forms a unique data string for pw.

Algorithms, Functions

H(a) is a hash-function, which takes a data string a as input and outputs another date string b. H(a) is defined as:

$$H: \{0,1\}^{/a} \to \{0,1\}^{/b}$$

MAC(mk, a) is a message authentication code algorithm, which takes a key mk and a data string a as input and outputs another date string b. MAC(mk; a) is defined as:

$$MAC: \{0,1\}^{/mk} \times \{0,1\}^{/a} \to \{0,1\}^{/b}$$

Sigsk(m) and Vervk($\sigma$, m) are complementary signing and signature verification algorithms. Sigsk(m) takes a message m and a signing key sk as input and outputs a signature $\sigma$. Vervk($\sigma$, m) takes a signature $\sigma$, a message m (if m is not recoverable from $\sigma$) and a verification key vk as input and outputs '1' (accept) or '0' (reject). An example signing/signature-verification scheme for signature/verification keys sk/vk of the general form $x/(base)^x$ is the Schnorr signature scheme as described in, "Efficient signature generation by smart cards." C. P. Schnorr, Journal of Cryptology, 4(3):161-174, 1991, herein incorporated by reference.

certGen(cgk, $\alpha$) and certVer(cvk; cer) form a complementary pair of algorithms. certGen takes a key cgk and a data string $\alpha$ as input and outputs a certificate cer (containing, at least, $\alpha$ and a signature over $\alpha$); certVer takes a key cvk and a certificate cer as input and outputs '1' (accept) or '0' (reject) as appropriate. If (cgk; cvk) is an asymmetric key pair, certGen is a signature signing algorithm and certVer is a signature verification algorithm. If cgk=cvk, both certGen and certVer are MAC algorithms. In the following, certGen and certVer are only used by the server S so that cgk and cvk can be the same or form an asymmetric key pair (the specific examples given have cgk=cvk).

KDF($\alpha$) is a key derivation function, which takes a data string $\alpha$ as input and outputs another data string b. This function can be implemented by using a hash-function.

a||b denotes concatenation of two data string a and b.

It will be appreciated that, in practise, many of the above functions and algorithms will use, in addition to the noted parameters, various domain public parameters and this is taken as understood in the following description.

First Embodiment: PWB Designated Verifier Signature Scheme; RSA Implementation (FIGS. 2 & 3)

The first embodiment is an RSA implementation of a password-based signature scheme and is described below with reference to FIG. 2 (system set up and registration phases) and FIG. 3 (operational phase).

System Set Up

In the system set up phase 20, the domain public parameters and one or more server secrets are established.

In step 21 the server S generates a prime e and two large primes, p and q; the server then computes n=pq and d=1/e mod (p−1)(q−1) after which it preferably deletes p and q but, if not, it keeps them secret; it will be appreciated that (d, n) and (e, n) constitute an RSA secret/public key pair. The master secret $ms_S$ of the server S is constituted by d.

In step 22 the server S publishes (makes available to domain users) domain public parameters comprising:

$I_S$, pwText, e, n a subgroup of a finite field with modulus P of order n i.e. P=ln+1, where l is an arbitrary integer; a generator g of the subgroup where g=(g')$^l$ mod P for any g' satisfying: 1<g'<P−1 two hash functions:

$$H_1: \{0,1\}^{/pw} \to \{0,1\}^{/n}\ H_2: \{0,1\}^{/d+/I_U+/pwText} \to \{0,1\}^{/b}$$

complementary certificate generation and verification algorithms:

certGen(cgk, α), certVer(cvk; cer)

complementary signing and signature verification algorithms:

Sig$_{sk}$(m) and Ver$_{vk}$(σ, m)

/pw, /d, /$I_U$

The parameters certGen, certVer, $H_2$, /d are, in fact, only used by S so do not need to be published by S. Furthermore, as the value pwText is uniquely associated with a user's password pw, it does not need to be published by S where S has made available directly to the user; alternatively, the server S can publish a template for computing pwText, for example:

pwText=[$I_U$]∥[time when the registration is made]∥[valid period of pw]∥[usage of pw].

Publication may simply involve the server S providing the user U with the domain public parameters when the user U contacts the server to register with the latter (see Registration Phase below). It will be appreciated that at least some of the domain public parameters may be generated and published by a domain entity distinct from the server S (in which case certGen, certVer, $H_2$, /d will need to be published).

Registration (First Version: Via Authenticated and Secure Channel)

In this example, the user U and server S communicate over an authenticated and secure channel established through the network 18. As depicted in box 30 in FIG. 2, the registration phase proceeds as follows:

U sends pw to S (arrow 31)

S uses pw and its master key $ms_S$(d) to compute $pk_U$ (step 32) as:

$$pk_U = g^{1/(H_1(pw)^d \bmod n)} \bmod P$$

S also computes:

$$k = H_2(d\|I_U\|pwText)$$

$$cer_U = cerGen(k, I_U\|pk_U\|pwText)$$

after which the server deletes pw and k (and optionally, all transaction record).

S sends $pk_U$, $cer_U$ to U (arrow 33)

U stores $pk_U$, $cer_U$ for later use (step 34), for example, on the client being used by U or in a smart card.

Note that U has not been indicated as explicitly sending $I_U$ to S because the nature of the authenticate channel is inherently such that S can discover the identity of U (this may, of course, involve U sending $I_U$ to S).

Registration (Second Version: Via Authenticated, but not Necessarily Secure, Channel)

In this example, the user U and server S communicate over an authenticated channel established through the network 18. The registration phase (not specifically shown in the drawings) proceeds as follows:

U computes:

$$u = g^\alpha \text{ where } \alpha \in_R Z^*_q$$

$$v = H_1(pw)\alpha^e \bmod n$$

U sends u, v to S

S uses its master key $ms_S$(d) to compute as:

$$pk_U = u^{1/(v^d \bmod n)} \bmod P$$
$$= g^{1/(H_1(pw)^d \bmod n)} \bmod P$$
$$k = H_2(d\|I_U\|pwText)$$
$$cer_U = cerGen(k, I_U\|pk_U\|pw\text{ Text})$$

after which the server deletes pw and k (and optionally, all transaction record).

S sends $pk_U$, $cer_U$ to U.

U stores $pk_U$, $cer_U$.

Operational

When U wants to sign a message m for S with S subsequently verifying the signature, they proceed as follows (see Operational Phase 40 in FIG. 3):

U generates a short-term secret x (step 41):

$$x \in_R Z^*_n$$

to serve as a short-term secret key of an asymmetric key pair, the complementary non-secret key of which is X=g$^x$ (U does not, in this embodiment, need to compute X). As will be seen below, x and X are used in this embodiment as complementary signing and signature verification keys.

U computes a short-term password-based public key A based on its password pw and x:

$$A = H_1(pw)x^e \bmod n$$

U signs the message m using its short term secret key x (step 42) to generate signature $\sigma_U$:

$$\sigma_U = \text{Sig}_x(m)$$

U sends {$\sigma_U$, m, $pk_U$, $cer_U$, A} (arrow 43)

S re-computes key k and then checks the certificate $cer_U$ to confirm that it is one it previously generated (step 44):

$$k = H_2(d\|I_U\|pwText)$$

result=certVer(k, $cer_U$)

If result=0, S aborts; if result=1, S proceeds (next step is step 45).

S now knows the long-term password based public key $pk_U$ for a user identified by $I_U$, and terms and conditions pwText associated with $pk_U$. Unless the terms and conditions indicate otherwise (for example, because a validity period specified in pwText has expired), S now uses $pk_U$, A and its master secret d to compute (step 45):

$$X = pk_U^{(A^d \bmod n)} \bmod P$$

(which can be shown to correspond to g$^x$ mod P assuming A was generated by the user with identity $I_U$, that is, that the password used to generate A is the same as that used for the certified $pk_U$)

X forms the signature verification key corresponding to the signing key x used to sign $\sigma_U$.

S now verifies (step 46) the signature $\sigma_U$ on m:

$$\text{result} = \text{Ver}_X(\sigma_U, m)$$

If result=0, the signature is invalid; if result=1, S accepts the signature as a valid signature on m by the user identified by $I_U$.

Figure 4:
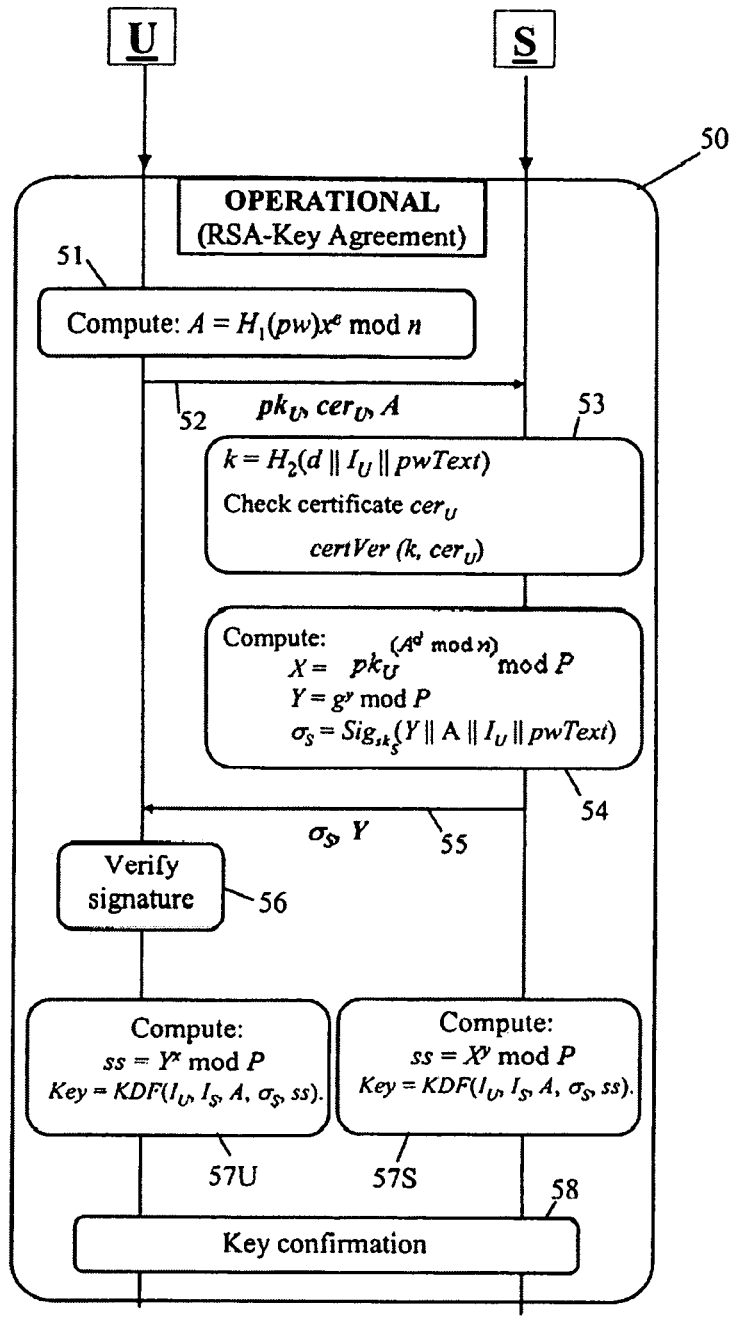
FIG. 4 is a diagram illustrating operations carried out during an operational phase of a second embodiment of the present invention.

Second Embodiment: PWB Authenticated Key Agreement; RSA Implementation (FIG. 4)

The second embodiment is an RSA implementation of a password-based authenticated key agreement protocol and its operational phase is described below with reference to FIG. 4. Both the system set up and registration phases are substantially as described above for the first embodiment with the addition that, during system set up, the server S also creates (in step 21) a secret/public key pair $sk_S$ and $pk_S$ respectively for signing/verification purposes; optionally, this key pair can be constituted by the RSA secret/public key pair (d, n)/(e, n). If $pk_S \neq$ (e, n) and so not already published in step 22 as a domain public parameter, the key $pk_S$ is published in step 22. The domain public parameters now also include the key derivation function KDF( ).

Operational

When U and S want to establish a shared session key between them, they proceed as follows (see operational phase 50 in FIG. 4):

U generates a short-term secret x:

$$x \in_R Z^*_n$$

U computes a short-term password-based public key A (step 51):

$$A = H_1(pw)x^e \bmod n$$

U sends $\{pk_U, cer_U, A\}$ to S (arrow 52)

S re-computes certificate key k and then checks the certificate $cer_U$ to confirm that it is one it previously generated (step 53):

$$k = H_2(d\|I_U\|pwText)$$

$$\text{result} = \text{certVer}(k, cer_U)$$

If result=0, S aborts; if result=1, S proceeds (next step is step 54).

S now knows the long-term password based public key $pk_U$ for a user identified by $I_U$, and terms and conditions pwText associated with $pk_U$. Unless the terms and conditions indicate otherwise (for example, because a validity period specified in pwText has expired), S now uses $pk_U$, A and its master secret d to compute (step 45):

$$X = pk_U^{(A^d \bmod n)} \bmod P$$

(which can be shown to correspond to $g^x \bmod P$ assuming A was generated by the user with identity $I_U$, that is, that the password used to generate A is the same as that used for the certified $pk_U$) X forms U's contribution for a DH key exchange.

S also computes:

$$Y = g^y \bmod P \text{ where } y \in_R Z^*_n.$$

$$\sigma_S = \text{Sig}_{sks}(Y\|A\|I_U\|pwText)$$

Including the value A in the signed content tells U this signature is freshly computed by S after receiving A. This is optional since the final shared key includes the value A.

S sends $\{\sigma_S, Y\}$ to U (arrow 55)

U checks (step 56) whether the signature $\sigma_S$ is a valid signature on message $(Y\|A\|I_U\|pwText)$:

$$\text{result} = \text{Ver}_X(\sigma_U, Y\|A\|I_U\|pwText)$$

If result=0, the signature is invalid; if result=1, U accepts Y as S's contribution for a DH key exchange.

U and S each compute $g^{(xy)} \bmod P$ as their shared secret ss, as follows (step 57U, 57S):

$$S: ss = X^y \bmod P$$

$$U: ss = Y^x \bmod P$$

S deletes X and y and U deletes x.

U and S then each compute a shared key Key as: Key=KDF $(I_U, I_S, A, \sigma_S, ss)$.

Note that in order to guarantee security, it is necessary to have user-to-server key confirmation (step 58), that is, to have the user U prove to the server S that it knows the shared key Key. A typical key confirmation mechanism uses a hash-function applied to the key, the user's identity and some extra agreed text. The output of the hash-function is transferred from one party to another in clear text. An example key confirmation scheme is the one specified in ISO/IEC 10117-4 and IEEE P1363.2.

Figure 5:
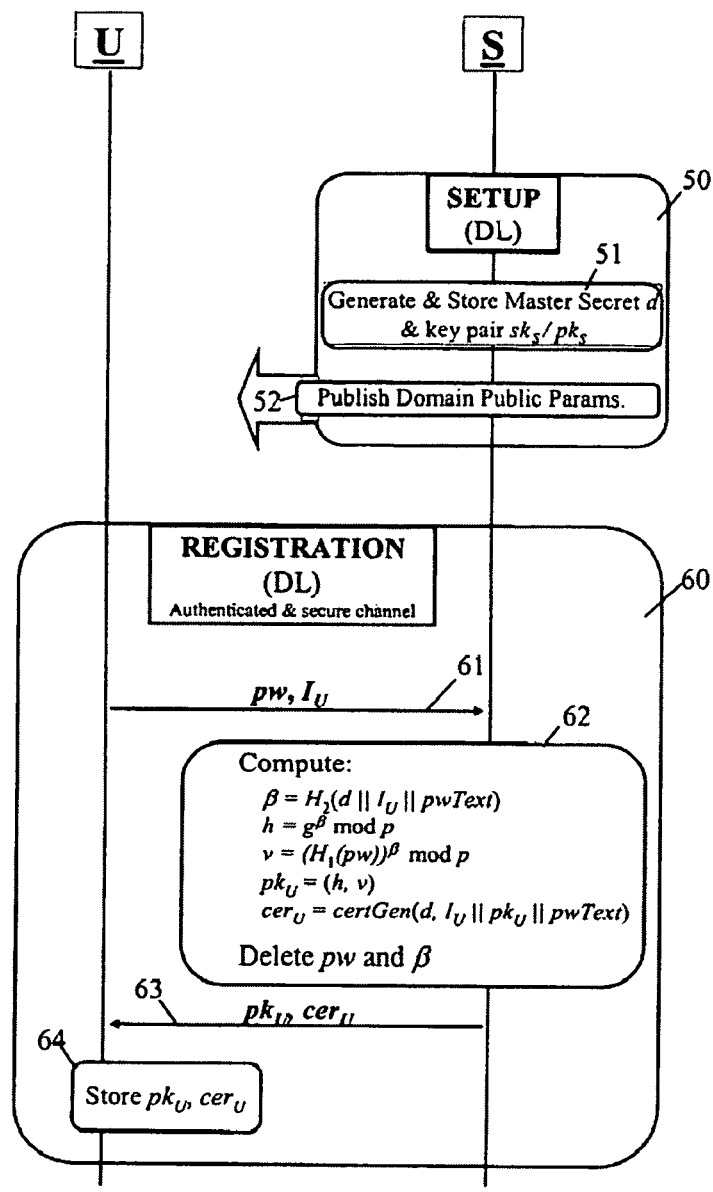
FIG. 5 is a diagram illustrating operations carried out during set up and registration phases of a third embodiment of the invention.
Figure 6:
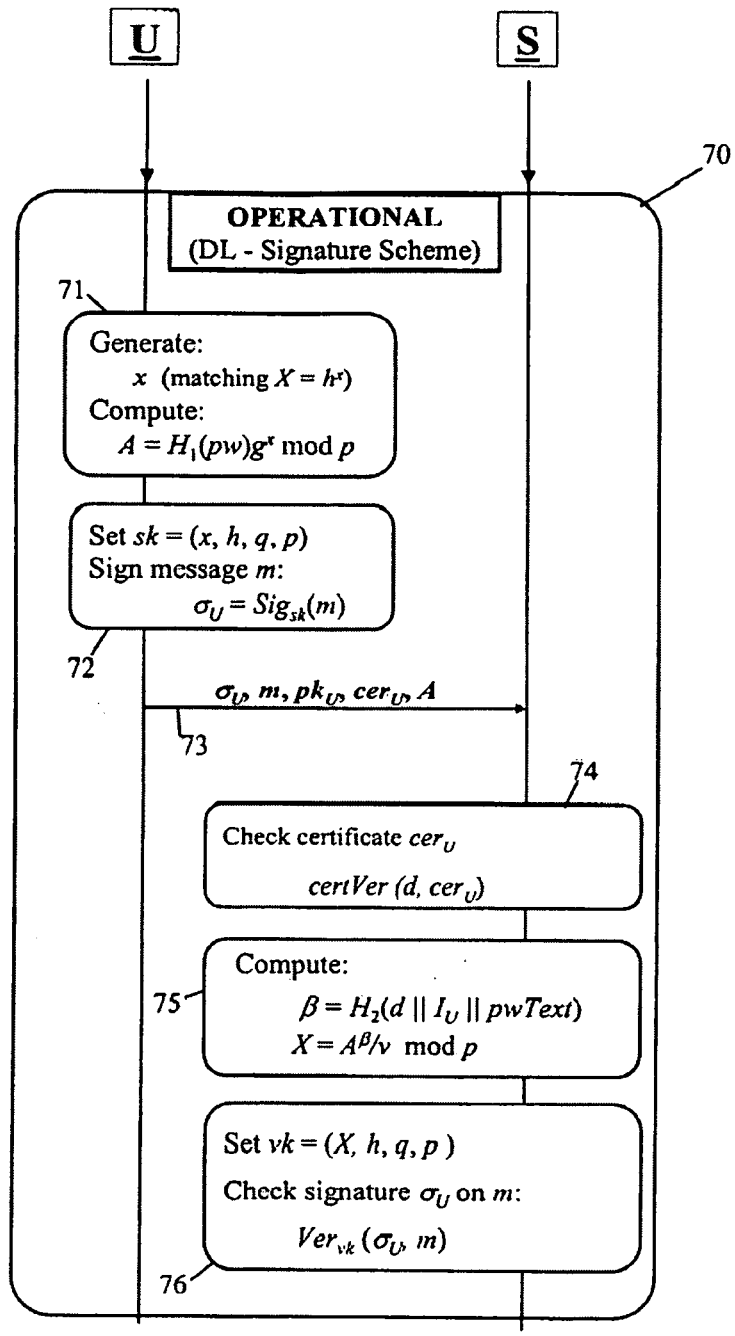
FIG. 6 is a diagram illustrating operations carried out during an operational phase of the third embodiment.

Third Embodiment: PWB Designated Verifier Signature Scheme; DL Implementation (FIGS. 5 & 6)

The third embodiment is a DL implementation of a password-based signature scheme and is described below with reference to FIG. 5 (system set up and registration phases) and FIG. 6 (operational phase).

System Set Up

In the system set up phase 50 (FIG. 5), the domain public parameters and a server secret are established.

In step 51 the server S generates and stores a master secret key $d \in Z^*_q$.

In step 52 the server S publishes (makes available to domain users) domain public parameters comprising:

$I_S$, $pk_S$, pwText a triple (p, q, g), where p and q are two large primes such that $q|(p-1)$, and g is a generator of subgroup of finite field group with prime modulus p of order q;

three hash-functions:

$$H_1: \{0,1\}^{l_{pw}} \to \{0,1\}^{l_n}$$

$$H_2: \{0,1\}^{l_d + l_{I_U} + l_{pwText}} \to \{0,1\}^{l_k}$$

$$H_3: \{0,1\}^{l_{I_U}} = \{0,1\}^{l_{pkU}} = \{0,1\}^{l_p} = \{0,1\}^{l_m} \to Z^*_q$$

complementary certificate generation and verification algorithms:

$$\text{certGen}(cgk, a), \text{certVer}(cvk; cer)$$

complementary signing and signature verification algorithms:

$$\text{Sig}_{sk}(m) \text{ and } \text{Ver}_{vk}(\sigma, m)$$

(note that these signing and signature verification algorithms are not required in the second version of the DL signature scheme described below)

$l_{pw}, l_d, l_{I_U}$

The parameters certGen, certVer, $H_2$, $l_d$ are, in fact, only used by S so do not need to be published by S; however, if the domain public parameters are published by an entity other than S, then certGen, certVer, $H_2$, $l_d$ should be included. As with the first embodiment. pwText could be made available only to U, or S may publish a template for pwtext.

Registration

In the registration phase 60, user U, with identity $I_U$ and password pw $\in_R Z^*_h$, registers with S to create a long-term password-based public key $pk_U$ by executing the following protocol over an authenticated and secure channel.

U sends $\{I_U, pw\}$ to S (arrow 61)
S computes (step 62):

$$\beta = H_2(d\|I_U\|pwText)$$

$$h = g^\beta \bmod p$$

$$v = (H_1(pw))^\beta \bmod p$$

and deletes pw and β.
S computes (also step 62):

$$cer_U = certGen(d, I_U\|pk_U\|pwText)$$

after which the server optionally deletes all transaction record.
S sends $pk_U$, $cer_U$ to U (arrow 63)
U stores $pk_U$, $cer_U$ (step 64).

Registration (Alternative)

If U can only communicate with S over an authenticated, but not secure, channel then the following registration protocol can be used instead of the one described above.

U generates $\alpha \in_R Z^*_q$; and computes:

$$u = (H_1(pw))^\alpha \bmod p$$

U sends $\{I_U, u\}$ to S
S computes:

$$\beta = H_2(d\|I_U\|pwText)$$

$$h = g^\beta \bmod p$$

$$w = u^\beta \bmod p$$

S then deletes β
S sends $\{h, w\}$ to U
U computes:

$$v = w^{1/\alpha} \bmod p$$

and then erases β, u and w. U sets $pk_U$ to (h, v)
U sends $pk_U$ to S
S computes:

$$cer_U = certGen(d, I_U\|pk_U\|pwText)$$

S then optionally deletes all transaction record
S sends $cer_U$ to U
U stores $pk_U$, $cer_U$.

For both versions of the DL-based registration protocols described above, note that:

- as with the RSA-based registration protocols, U has not been indicated as explicitly sending $I_U$ to S because the nature of the authenticate channel is inherently such that S can discover the identity of U (this may, of course, involve U sending $I_U$ to S).
- for certain applications (see, for example, the second of the DL signature schemes described below) the value h is omitted, in which case $pk_U = v$.

Operational

Two versions of the DL PWB signature scheme are described below, one based on $pk_U$ including h and the other with $pk_U$ not including h.

Considering first the case where $pk_U$ includes h, that is, $pk_U = (h,v)$, when U wants to sign a message m for S with S subsequently verifying the signature, they proceed as follows (see operational phase 70 in FIG. 6):

U generates a short-term secret x (step 71):

$$x \in_R Z^*_q$$

to serve as a short-term secret key element of an asymmetric key pair comprising:
secret key = (x, h, q, p)
non-secret key = (X, h, q, p) where $X = h^x \bmod p$ (U does not, in this embodiment, need to compute X). These short-term secret/non-secret keys are used in this embodiment as complementary signing and signature verification keys sk/vk.

U computes a short-term password-based public key A based on its password pw and x:

$$A = H_1(pw)g^x \bmod p$$

U signs the message m using its short term secret key (x, h, q, p) as a signing key sk to generate signature $\sigma_U$ (step 72):

$$\sigma_U = Sig_{sk}(m)$$

U sends $\{\sigma_U, m, pk_U, cer_U, A\}$ to S (arrow 73)
S checks the certificate $cer_U$ to confirm that it is one it previously generated (step 74):

$$result = certVer(d, cer_U)$$

If result=0, S aborts; if result=1, S proceeds (next step is step 75).

S now knows the long-term password-based public key $pk_U$ for a user identified by $I_U$, and terms and conditions pwText associated with $pk_U$. Unless the terms and conditions indicate otherwise (for example, because a validity period specified in pwText has expired). S now uses $pk_U$, A and its master secret d to compute (step 75):

$$\beta = H_2(d\|I_U\|pwText) \text{ (this is a re-computation)}$$

$$X = A^\beta/v \bmod p$$

(which can be shown to correspond to $h^x \bmod p$ assuming A was generated by the user with identity $I_U$, that is, that the password used to generate A is the same as that used for the element v of the certified $pk_U$ and corresponds to the identity $I_U$ used by S in re-computing the constituent β of $pk_U$)

S can now form the signature verification key vk corresponding to the signing key used to sign $\sigma_U$ (assuming the signing party is the user with identity $I_U$):

$$vk = (X, h, q, p)$$

S next verifies (step 76) the signature $\sigma_U$ on m:

$$result = Ver_{vk}(\sigma_U, m)$$

If result=0, the signature is invalid; if result=1, S accepts the signature as a valid signature on m by the user identified by $I_U$.

The version of the DL PWB signature scheme based on $pk_U = v$, that is, not including h, will now be described (this version is not specifically illustrated in the drawings). When U wants to sign a message m for S with S subsequently verifying the signature, they proceed as follows:

U generates a short-term secret x:

$$x \in_R Z^*_q$$

and then computes:

$$X = (pk_U)^x \bmod p$$

U computes a short-term password-based public key A based on its password pw and x:

$$A = H_1(pw)^x \bmod p$$

U computes a signature $\sigma_U$ on the message m using X.

$$\sigma_U = H_3(I_U \| pk_U \| X \| A \| m)$$

It will be appreciated that this signature is of rather different form to those generated in the signature schemes described above and depends for its uniqueness to U on the inclusion of X in the $H_3$ hash. As will be seen below, the server verifies this signature by regenerating it after recovering X using A and the server's master secret d.

U sends $\{\sigma_U, m, pk_U, cer_U, A\}$ to S.

S checks the certificate $cer_U$ to confirm that it is one it previously generated:

$$\text{result} = \text{certVer}(d, cer_U)$$

If result=0, S aborts; if result=1, S proceeds.

S now knows the long-term password based public key $pk_U$ for a user identified by $I_U$, and terms and conditions pwText associated with $pk_U$. Unless the terms and conditions indicate otherwise (for example, because a validity period specified in pwText has expired), S now uses A, its master secret d, and the user specific component $I_U$ of $pk_U$ as follows to compute a key element X' that should correspond to the key element X used by U:

$$\beta = H_2(d \| I_U \| pwText) \text{ (this is a re-computation)}$$

$$X' = A^\beta \bmod p$$

(which can be shown to correspond to $(pk_U)^x \bmod p$, and therefore to X, provided that A was generated by the user with identity $I_U$, that is, that the password used to generate A is the password corresponding to the identity $I_U$ used by S in re-computing the constituent $\beta$ of $pk_U$)

S now verifies the signature $\sigma_U$ on m by regenerating the signature using X':

$$\sigma'_U = H_3(I_U \| pk_U \| X' \| A \| m).$$

If $\sigma'_U \neq \sigma_U$, the signature is invalid; otherwise S accepts the signature as a valid signature on m by the user identified by $I_U$.

It is be noted that the complementary key elements x/X could alternatively have been used in a more conventional signing/signature-verification scheme. It is also be noted that, in this version of the signature scheme (and in contrast to the other schemes described), X should be kept confidential, because $X = A^\beta$ and any pair of base and $(\text{base})^\beta$ could be used to create a valid signature.

Figure 7:
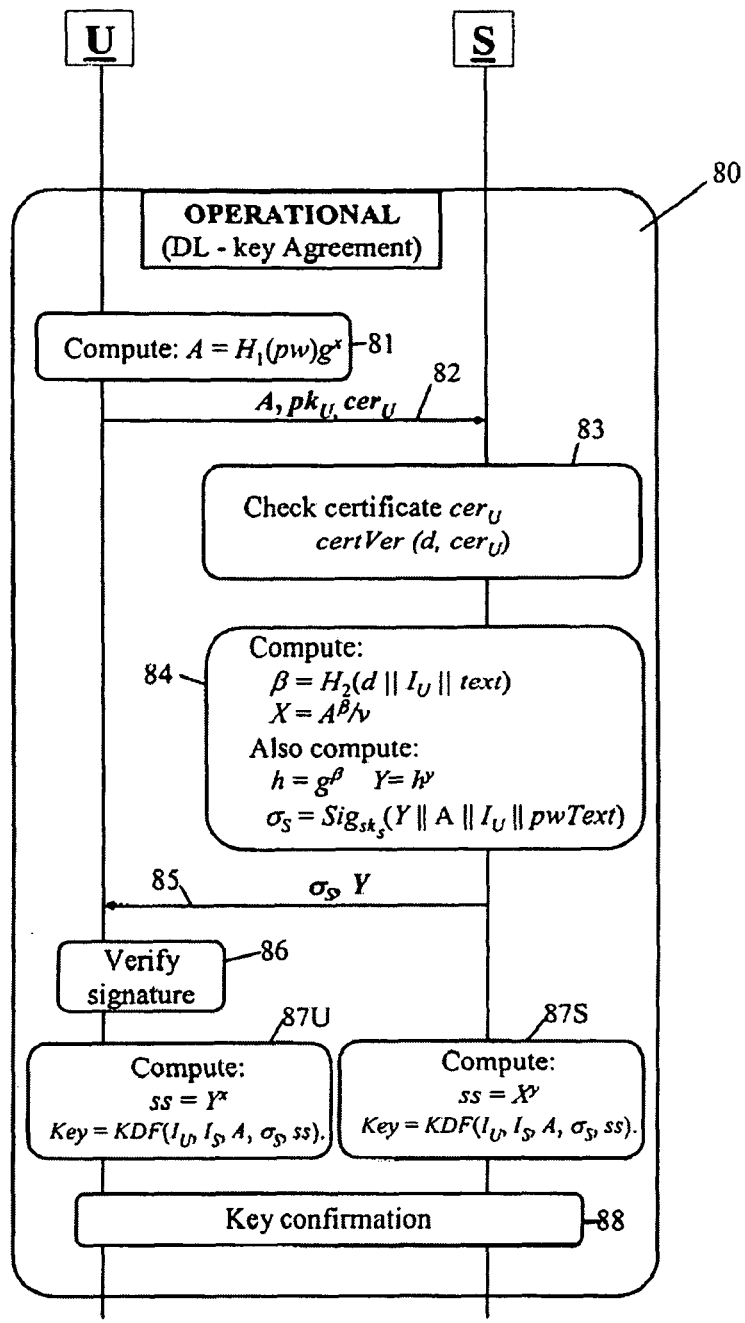
FIG. 7 is a diagram illustrating operations carried out during an operational phase of a fourth embodiment of the present invention.

Fourth Embodiment: PWB Authenticated Key Agreement Scheme; DL Implementation (FIG. 7)

The fourth embodiment is a discrete logarithm (DL) implementation of a password-based authenticated key agreement protocol and its operational phase is described below with reference to FIG. 7. Both the system set up and registration phases are substantially as described above for the third embodiment with the addition that, during system set up, the server S also creates (in step 21) a secret/public key pair $sk_S$ and $pk_S$ respectively for signing/verification purposes; optionally, this key pair can be constituted by the DL secret/public key pair $d/(g^d \bmod p, q, p)$—if not, the key $pk_S$ is published in step 52. The domain public parameters now also include the key derivation function KDF( ). For this embodiment $pk_U = (h, v)$.

Operational

When U and S want to establish a shared session key between them, they proceed as follows (see Operational Phase 80 in FIG. 7):

U generates a short-term secret x:

$$x \in_R Z^*_q$$

U computes a short-term password-based public key A (step 81):

$$A = H_1(pw) g^x \bmod n$$

U sends $\{A, pk_U, cer_U\}$ to S (arrow 82)

S checks the certificate $cer_U$ to confirm that it is one it previously generated (step 83):

$$\text{result} = \text{certVer}(d, cer_U)$$

If result=0, S aborts; if result=1, S proceeds (next step is step 84).

S now knows the long-term password based public key $pk_U$ for a user identified by $I_U$, and terms and conditions pwText associated with $pk_U$. Unless the terms and conditions indicate otherwise (for example, because a validity period specified in pwText has expired), S now uses $pk_U$, A and its master secret d to compute X as U's DH contribution for a DH key exchange as follows (step 84):

$$\beta = H_2(d \| I_U \| pwText) \text{ (this is a re-computation)}$$

$$X = A^B / v \bmod p$$

(which can be shown to correspond to $h^x \bmod p$ provided that the password used in generating A is the same as that used for the element v of the certified $pk_U$ and corresponds to the identity $I_U$ used by S in re-computing the constituent $\beta$ of $pk_U$)

S deletes $\beta$

S also computes:

$$h = g^\beta \bmod p \text{ (this is a re-computation)}$$

$$Y = h^y \bmod p \text{ where } y \in_R Z^*_q$$

$$\sigma_S = \text{Sig}_{sk_S}(Y \| A \| I_U \| pwText)$$

S sends $\{\sigma_S, Y\}$ to U (arrow 85)

U checks whether the signature $\sigma_S$ is a valid signature on message $(Y \| A \| I_U \| pwText)$; if this check is passed, U accepts Y (step 86).

U and S each compute $g^{(xy)} \bmod p$ as their shared secret ss, as follows (step 87U, 87S):

S: $ss = X^y \bmod p$
U: $ss = Y^x \bmod p$

U and S then each compute a shared key Key as:

$$\text{Key} = \text{KDF}(I_U, I_S, A, \sigma_S, ss).$$

In order to guarantee security, it is necessary to have user-to-server key confirmation (step 88), that is, to have the user U prove to the server S that it knows the shared key Key.

In all the described embodiments, it can be seen that during the operational phase, the user U generates a short-term secret x and the server S computes a complementary element X of the form $(\text{base})^x$ from which recovery of x is computationally infeasible; the value of base for each embodiment is as follows:

| | | |
|---|---|---|
| First embodiment | RSA signature scheme | base = g |
| Second embodiment | RSA key agreement scheme | base = g |
| Third embodiment | DL signature scheme, $pk_U$ = (h,v) | base = h |
| | DL signature scheme, $pk_U$ = (v) | base = v |
| Fourth embodiment | DL key agreement scheme | base = h |

As can be seen, base is a public parameter, being either a domain public parameter or all or part of the long-term password-based public key $pk_U$.

S computes X by transforming U's short-term password-based public key A (a function of pw and x) using S's master secret $ms_S$ and either the long-term password-based public key $pk_U$ of the expected user (as in the first and second embodiments) or a user-specific constituent the long-term password-based public key (as in the case of the third and fourth embodiments where at least β provides such a constituent). This transformation will only work to produce the correct value for X if the $pk_U$ (or its user-specific constituent) used by S in effecting the transformation corresponds to the password pw used by A when generating the short-term password-based public key A (it is to be noted that A can only be generated from a direct knowledge of pw, knowledge of $pk_U$ is not enough). If the pair of elements x/X is found to be effective in the cryptographic process being implemented in the operational phase concerned, then the server knows that it is interacting with the user U associated with the $pk_U$ (or its user-specific component) used by S when computing X.

The complementary pair of elements x/X can either be used directly to provide a matching key pair in the cryptographic process being implemented (as in the first embodiment and the first version of the third embodiment), or can be further processed to provide a matching key pair for use in the cryptographic process (as in the second and fourth embodiments where x/X are used in a DH key exchange, or in the second version of the third embodiment where X is used as a shared secret with U constructing this shared secret from $pk_U$ and x—this secret sharing is, in effect, a key transport process). As will be appreciated, in the foregoing sentence (and as used in the claims), the word "matching" is used in the term "matching key pair" to encompass both an asymmetric key pair and two identical keys (that is a symmetric key) held by U and S respectively. Although in the described embodiments, the use of the complementary elements x/X directly as an asymmetric key pair is in relation to designated verifier signatures schemes (first and third embodiments), the asymmetric key pair could equally as well have been used in an encryption scheme.

A significant advantage of all the embodiments described is that during the operational phase the server S does not need to know U's password pw as such. The server S only needs to protect its long term master secret $ms_S$ which can be protected, for example, by using a Trusted Platform Module (a hardware security component with limited storage space and communication capability that is intended to provide roots of trust for a host computing platform—see Trusted Computing Group TPM Specification 1.2, available at http://www.trustedcomputinggroup.org.). Indeed, in the described embodiments, the server S does not even need to store the tuple ($pk_U$, $I_U$) of each user as each such tuple is placed in a server-signed certificate $cer_U$ and given to the user to store, for return to the server when needed (at which time the server verifies the certificate and thus the integrity of the tuple, including the association of $pk_U$ and $I_U$).

As a non-preferred alternative to using $cer_U$ the server S can store the tuple ($pk_U$, $I_U$) of each user in its storage subsystem 13 and pass $pk_U$ to the user. No special precautions need be taken regarding the security of this storage since the password pw cannot be recovered from $pk_U$ and changing $pk_U$ will simply result in protocol failure; however, preferably, the tuple is stored as certificate $cer_U$ to permit detection of any change to the identity $I_U$ associated with $pk_U$; other cryptographic means can alternatively be used for this purpose.

It will be appreciated that many other variants are possible to the above described embodiments of the invention. Thus, in general any homomorphic scheme can be used.

It will also be appreciated that use of pwText is optional. Furthermore, where various quantities have been combined by concatenation (as indicated by the operator ||) such as in the generation of β in the third and fourth embodiments, other deterministic combining functions can alternatively be used.

Although in the described embodiments authentication of user U by the server S was a primary purpose of creating the complementary elements x and X, it would also be possible to create these elements, in the manner described, for cryptographic use without regard to the possibility of authentication of the user U by the server S (for example, the above-described key agreement schemes can be implemented without the final step of user-to-server key confirmation that is required to authenticate the user to the server)

The invention claimed is:

1. A cryptographic method effected between first and second parties acting through respective computing entities, the first party having a specified identity, a secret password, and a long-term password-based public key that is dependent on at least said password and a master secret of the second party; the method comprising:
   the first party generating a short-term random secret x, and then computing and supplying to the second party, a short-term password-based public key that requires for its computation direct knowledge of the first party's password and secret x;
   the second party transforming the short-term password-based public key into an element X, complementary to x but from which recovery of x is computationally infeasible, by using its master secret and at least a first-party-specific constituent of the first party's long-term password-based public key that is associated with the specified identity of the first party; and
   using the secret x and element X to provide matching keys for the parties.

2. The method of claim 1, wherein the element X is related to the secret x as $(base)^x$ where base is one of a domain public parameter, the long-term password-based public key, and a component of the latter.

3. The method of claim 1, wherein the secret x and element X are used directly as matching keys in the form of an asymmetric key pair.

4. The method of claim 3, wherein the secret x is used by the first party as a signature key in a designated verifier signature process, the element X being used by the second party as a signature verification key.

5. The method of claim 1, wherein the secret x and element X are used to provide matching keys to the parties in the form of identical keys.

6. The method of claim 5, wherein the element X is used by the second party as the first party's contribution to a Diffie Hellman key exchange.

7. The method of claim 1, wherein the secret x and element X are used to authenticate the first party by the second party.

8. The method of claim 5, wherein the first party uses the secret x and its long-term password-based public key to compute the element X, the element X serving as the matching keys of both parties.

9. The method of claim 1, wherein the method is RSA based with public parameters comprising:
- a subgroup of a finite field with modulus P of order n, and a generator g of the subgroup where $g=(g^1)^l \bmod P$ for any $g^1$ satisfying: $1<g^1<P-1$; the element X corresponding to $g^x$;
- a prime e and a value n formed as the product of two large primes p and q;
- the master secret d of the second party corresponding to $1/e \bmod (p-1)(q-1)$.

10. The method of claim 9, wherein:
the first party's long-term password-based public key $pk_U$ is computed to correspond to:

$$pk_U = g^{\{1/((H_1(pw))^d \bmod n)\} \bmod P}$$

where $H_1$ is a hash function and pw is the first party's password;
the first party's short-term password-based public key A is computed as:

$$A = H_1(pw)x^e \bmod n$$

the second party transforms the short-term password-based public key A into the element X by computing:

$$X = pk_U^{(A^d \bmod n)} \bmod P$$

said 'at least a first-party-specific constituent of the first party's long-term password-based public key' being the first party's long-term password-based public key $pk_U$ itself.

11. The method of claim 10, wherein for generating the first party's long-term password-based public key $pk_U$, the first and second party communicate over an authenticated secure channel and the first party provides its password to the second party over that channel, the second party then directly computing the first party's long-term password-based public key $pk_U$ as:

$$pk_U = g^{1/(H_1(pw)^d \bmod n)} \bmod P.$$

12. A method according to claim 10, wherein for generating the first party's long-term password-based public key $pk_U$, the first and second party communicate over an authenticated channel, the first party computing:

$u = g^\alpha$ where $\alpha$ is a random secret, $$v = H_1(pw)\alpha^e \bmod n$$

and passing u and v to the second party over the authenticated channel, the second party then computing the first party's long-term password-based public key $pk_U$ as:

$$pk_U = u^{1/(v^d \bmod n)} \bmod P.$$

13. The method of claim 1, wherein the method is discrete log based with public parameters comprising a triple (p, q, g), where p and q are two large primes such that $q|(p-1)$, and g is a generator of subgroup of finite field group with prime modulus p of order q.

14. The method of claim 13, wherein
the first party's long-term password-based public key $pk_U$ is computed as:
$\beta = H_2$(a combination of at least d and $I_U$)
$h = g^\beta \bmod p$
$v = (H_1(pw))^\beta \bmod p$
$pk_U = (h, v)$ where $H_1$, $H_2$ are hash functions, d is the second party's master secret, $I_U$ the second party's identity, and pw is the first party's password;
the first party's short-term password-based public key A is computed as:

$$A = H_1(pw)g^x \bmod n$$

the second party transforms the short-term password-based public key A into the element X by computing:

$$X = A^\beta / v \bmod p$$

said 'at least a first-party-specific constituent of the first party's long-term password-based public key' being either of v and $\beta$.

15. The method of claim 14, wherein for generating the first party's long-term password-based public key $pk_U$, the first and second party communicate over an authenticated secure channel and the first party provides its password to the second party over that channel, the second party then directly computing the first party's long-term password-based public key $pk_U$ as:
$\beta = H_2$(a combination of at least d and $I_U$)
$h = g^\beta \bmod p$
$v = (H_1(pw))^\beta \bmod p.$ 16. The method of claim 14, wherein for generating the first party's long-term password-based public key $pk_U$, the first and second party communicate over an authenticated channel, the first party computing:
$u = H_1(pw)^\alpha \bmod p$ where $\alpha$ is a random secret,
and passing u to the second party over the authenticated channel, the second party then computing: $\beta = H_2$(a combination of at least d and $I_U$) $h = g^\beta \bmod p$ $w = u^\beta \bmod p$
and passing h and w to the first party over the authenticated channel, the first party computing: $v = w^{1/\alpha} \bmod p$
and setting the first party's long-term password-based public key $pk_U$ to (h, v).

17. The method of claim 13, wherein
the first party's long-term password-based public key $pk_U$ is computed as:

$\beta = H_2$(a combination of at least d and $I_U$)

$v = (H_1(pw))^\beta \bmod p$ $pk_U = (v)$ where $H_1$, $H_2$ are hash functions, d is the second party's master secret, $I_U$ the second party's identity, and pw is the first party's password;
the first party's short-term password-based public key A is computed as:

$$A = H_1(pw)^x \bmod n$$

the second party transforms the short-term password-based public key A into the element X by computing:

$$X = A^\beta \bmod p$$

said 'at least a first-party-specific constituent of the first party's long-term password-based public key' being $\beta$.

18. The method of claim 1, wherein the first party holds a certificate, signed by the second party, that incorporates the long-term password-based public key and identity of the first party, the first party passing the certificate to the second party to enable the latter to extract said 'at least a first-party-specific component of the first party's long-term password-based public key' that the second party uses in transforming the first party's short-term password-based public key into the element X.

19. The method of claim 1, wherein the first-party computing entity is a client and the second party computing entity is a server.

20. Apparatus comprising a first computing entity associated with a first party that has a specified identity, a secret password, and a long-term password-based public key, a second computing entity with an associated master secret, and a network over which the computing entities can communicate; wherein the first party's long-term password-based public key is dependent on at least the first party's password and the second party's master secret; and further wherein, in order to generate matching keys, asymmetric or symmetric, for a specific interaction between the first party and the second computing entity:

the first computing entity is arranged to generate a short-term random secret x, and then compute and supply to the second party, a first-party short-term password-based public key that requires for its computation direct knowledge of the first party's password and the secret x;

the second computing entity is arranged to transform the short-term password-based public key into an element X, complementary to x but from which recovery of x is computationally infeasible, by using its master secret and at least a first-party-specific constituent of the first party's long-term password-based public key that is associated with the specified identity of the first party; and the computing entities using the secret x and element X to provide said matching keys.

21. A password-based authenticated cryptographic method, comprising:

during a registration phase in which a first party, with a specified identity and secret password, registers with a second party, generating a long-term password-based public key in dependence on at least said password and a master secret of the second party;

during an operational phase:

the first party generating a short-term random secret x, and then computing and supplying to the second party, a short-term password-based public key that requires for its computation direct knowledge of the first party's password and its secret x;

the second party transforming the short-term password-based public key into an element X of the form (public parameter)$^x$ from which recovery of x is computationally infeasible, by using its master secret and at least a first-party-specific constituent of the first party's long-term password-based public key that is associated with the specified identity of the first party; and using the secret x and element X to provide matching keys for the parties;

the first and second parties acting through respective computing entities.

22. The method of claim 21, wherein a server is arranged to carry out the second party operations of the operational phase.

23. The method of claim 21, wherein during the operational phase, the second party does not have the secret password.

24. The method of claim 23, further comprising:

the first party providing the secret password to the second party during the registration phase; and the second party deleting the secret password before the operational phase.

25. The method of claim 1, the second party transforms the short-term password-based public key into the element X without having the secret password.

26. The apparatus of claim 20, wherein while the second computing entity transforms the short-term password-based public key into the element X, the second commuting entity does not have the secret password.

\* \* \* \* \*

UNITED STATES PATENT AND TRADEMARK OFFICE
CERTIFICATE OF CORRECTION

PATENT NO.       : 8,464,058 B1
APPLICATION NO.  : 12/258736
DATED            : June 11, 2013
INVENTOR(S)      : Liqun Chen et al.

It is certified that error appears in the above-identified patent and that said Letters Patent is hereby corrected as shown below:

In the Specification:

In column 10, line 49, delete $$\text{`` } H_3 : \{0,1\}^{I_U} = \{0,1\}^{I_{pk_U}} = \{0,1\}^{I_p} = \{0,1\}^{I_m} \to Z_q^* \text{ ''}$$

and insert $$-- H_3 : \{0,1\}^{I_U} \times \{0,1\}^{I_{pk_U}} \times \{0,1\}^{I_p} \times \{0,1\}^{I_p} \times \{0,1\}^{I_m} \to Z_q^*; --,$$ therefor.

In the Claims:

In column 17, line 43, in Claim 12, delete "A" and insert -- The --, therefor.

In column 17, line 43, in Claim 12, delete "according to" and insert -- of --, therefor.

In column 17, line 58, in Claim 13, delete "q|(p-1)," and insert -- q|(p-1)|, --, therefor.

In column 18, line 2, in Claim 14, after "$I_U$" insert -- is --.

In column 18, line 47, in Claim 17, after "$I_U$" insert -- is --.

Signed and Sealed this
Nineteenth Day of November, 2013

Teresa Stanek Rea
*Deputy Director of the United States Patent and Trademark Office*